Patented Oct. 13, 1925.

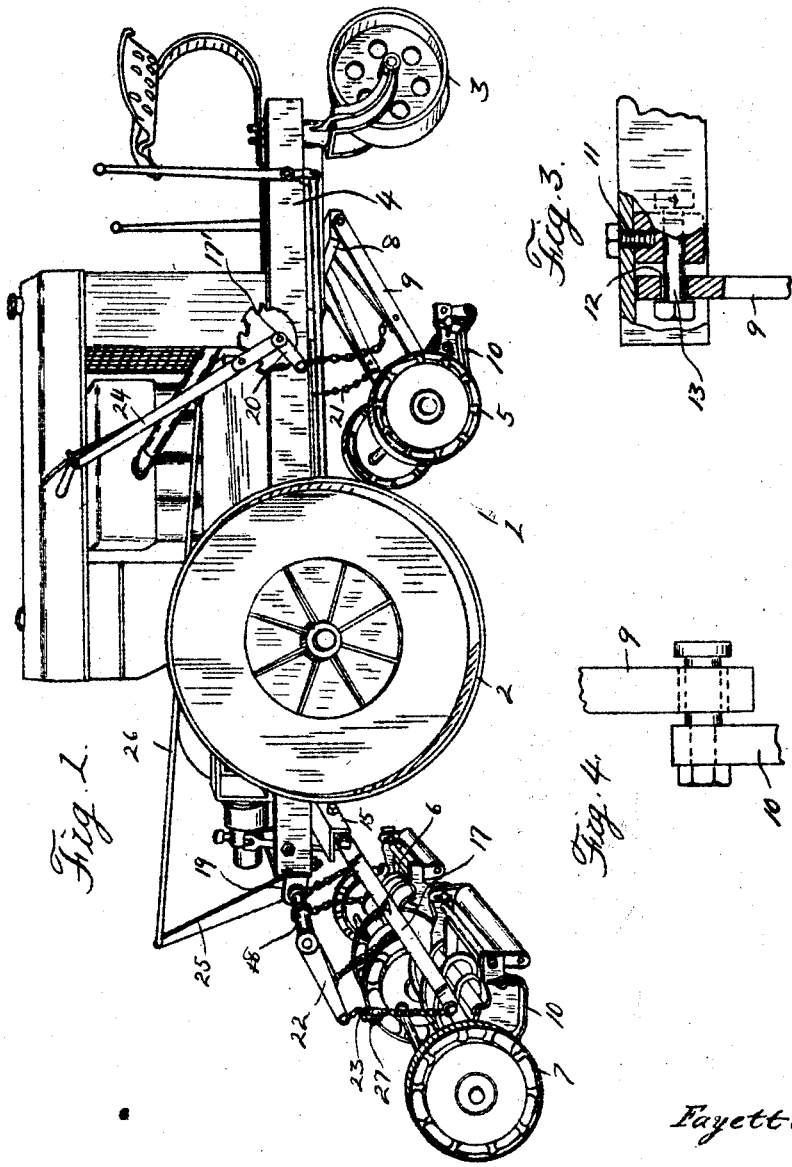

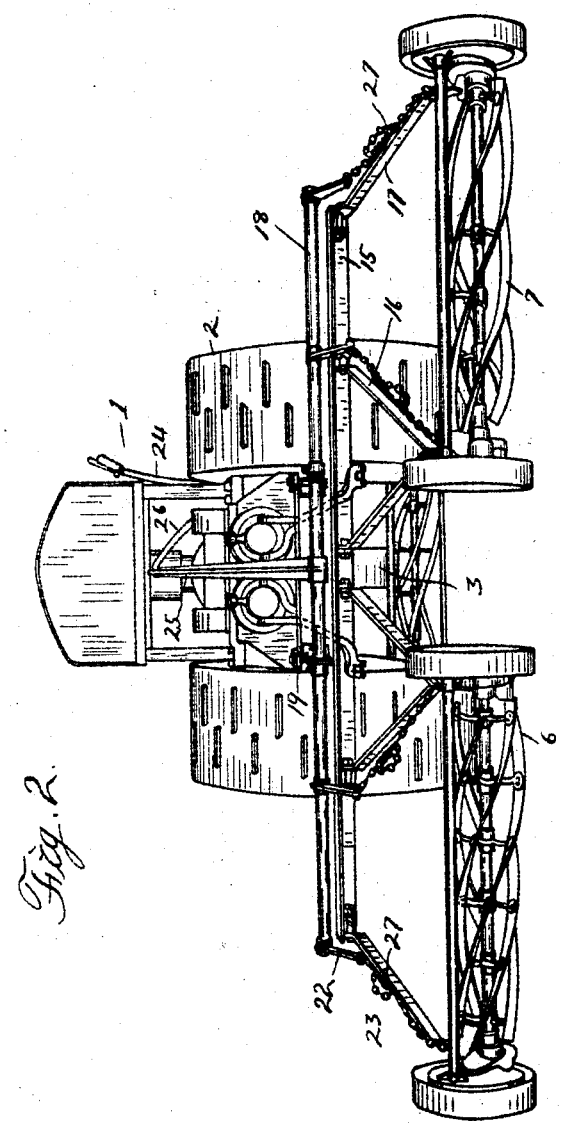

1,556,965

UNITED STATES PATENT OFFICE.

FAYETTE M. SEELEY, OF LANSING, MICHIGAN, ASSIGNOR TO IDEAL ENGINE COMPANY, OF LANSING, MICHIGAN, A CORPORATION OF MICHIGAN.

TRACTOR LAWN MOWER.

Application filed January 16, 1922. Serial No. 529,444.

*To all whom it may concern:*

Be it known that I, FAYETTE M. SEELEY, a citizen of the United States of America, residing at Lansing, in the county of Ingham and State of Michigan, have invented certain new and useful Improvements in Tractor Lawn Mowers, of which the following is a specification, reference being had therein to the accompanying drawings.

The invention relates to tractor lawn mowers and has for one of its objects the provision of a compact arrangement of tractor and mower units, by means of which a wide swath of grass can be cut at one time and the tractor lawn mower may be readily turned. Another object is to provide a simple form of propelling connection between the mower units and the tractor which will permit of the mower units freely engaging the ground and rotating parallel to planes transverse to their direction of travel. Further objects reside in the means for manually raising and lowering the mower units and also in the novel features of construction as more fully hereinafter set forth.

In the drawings:

Figures 1 and 2 are perspective views of a tractor lawn mower embodying my invention;

Figure 3 is a sectional elevation of a detail;

Figure 4 is a plan view showing the loose connection between the propelling links and mower units.

1 is a tractor having the combined driving and steering wheels 2 near its forward end and the third wheel 3 at its rear end, this wheel being free to change its plane of rotation relative to the tractor frame 4. 5 is a mower unit intermediate the ends of the tractor and preferably extending slightly beyond the opposite sides of its frame. 6 and 7 are aligned mower units at the forward end of the tractor and offset on opposite sides of the mower unit 5, the latter being of sufficient length to overlap the adjacent ends of the mower units 6 and 7 to cut that portion of the grass not cut by these forward units.

To propel the intermediate mower unit 5 from the tractor, there is the cross bar 8 preferably an angle bar, extending transversely of and secured to the lower side of the tractor frame 4, and extending between this cross bar and the intermediate mower unit are the downwardly and forwardly inclined links 9 pivotally connected to the side frames 10 of the mower unit and to the lugs 11 upon the cross bar 8. To permit of rotation of the mower unit parallel to a plane extending transversely of its direction of travel so that the mower unit may follow the contour of the ground, the pivotal connections at both the upper and lower ends of the links allow of limited freedom of movement of the links relative to the cross bar and of the mower unit relative to the links. As shown in Figure 3, the aperture 12 in the upper end of the link 9 which is engaged by the pivot 13 upon the lug 11 is of greater diameter than the pivot so that the link has limited transverse rocking movement. The apertures in the lower ends of the links are also of greater diameter than the pivots upon the side frames engaging in these apertures, as shown particularly in Figure 4. To prevent lateral movement of the intermediate mower unit relative to the tractor, the links 9 have bifurcated upper ends each of which is loosely pivotally connected to the cross bar 8 as above described.

To propel the forward mower units 6 and 7 and at the same time to permit of rotation of each parallel to a plane extending transversely of their direction of travel, there is the cross bar 15, extending transversely of the tractor frame 4 and secured to the lower side thereof at its forward end, and the downwardly and forwardly inclined links 16 and 17 pivotally connected to the side frames of each of the forward mower units and to the forward cross bar 15, the pivotal connections permitting of limited freedom of movement of the links relative to the cross bars and of the mower units relative to the links, the arrangement being the same as that of the links 9 for the intermediate mower unit. The links 16 for each of the forward mower units are bifurcated and loosely pivotally connected to the cross bar 15 so that relative lateral movement of the forward mower units and tractor is prevented.

To raise and lower the mower units, there are the rock shaft 17′, journalled in the tractor frame 4 intermediate its ends and extending transversely therethough, and also the rock shaft 18, extending transversely of the tractor frame and journalled in brackets 19 at the forward end of the tractor frame. 20 are rock arms upon the rock shaft 17', and 21 are flexible connections between these rock arms and the lower ends of the links 9, these flexible connections being chains in the present instance. 22 are rock arms upon the rock shaft 18, and 23 are flexible connections between the free ends of these rock arms and the lower ends of the links 16 and 17, these flexible connections also being chains. 24 is a hand lever fixedly secured to the rock shaft 17' in position to be readily operated by the driver of the tractor. This hand lever is connected to the rock arm 25 upon the rock shaft 18 near its middle by means of the link 26 whereby both rock shafts are actuated at the same time to raise or lower the forward and intermediate mower units. As specifically shown, one of the rock arms upon the rock shaft 17' is an integral part of the hand lever 24.

To hold the flexible connections 23 from engaging the knife reels of the forward mower units 16 and 17 when the mower units are in operation and move upwardly toward the rock arms 22, coil springs 27 are provided connected to separated links of the chain for yieldably taking up the slack, these springs permitting of the straightening of the chains under the weights of the mower units as the latter move away from the rock arms.

From the above description, it will be seen that I have provided a tractor lawn mower having several mower units, in which the total length is less than that of the usual tractor lawn mower in which all of the mower units are forward or back of the tractor. Also by having the forward mower units in close proximity to the forward end of the tractor, the mower can be more easily turned. Furthermore, the connections for propelling the mower units from the tractor are very simple as is also the mechanism for raising and lowering the mower units.

What I claim as my invention is:

1. In a tractor lawn mower, the combination with a tractor, of a mower unit and downwardly and forwardly inclined links pivotally connected to said mower units and to the frame of said tractor, one of said links having bifurcations pivotally connected to the tractor frame whereby lateral movement of said mower unit relative to said tractor is prevented.

2. In a tractor lawn mower, the combination with a tractor having a frame and a cross bar at the forward end therefor, of a mower unit at the forward end of said tractor, a rock shaft journalled in the forward end of said tractor frame, rock arms upon said shaft, flexible connections between said rock arms and mower unit, and a lever upon said tractor frame connected to said rock shaft for actuating the same.

3. In a tractor lawn mower, the combination with a tractor having a frame and cross bars intermediate its ends and at its forward end, of mower units intermediate the ends of said tractor and at its forward end, downwardly and forwardly inclined links pivotally connected to said mower units and to said cross bars, rock shafts journalled in said tractor frame and connected to said mower units for raising and lowering the same, and means for simultaneously actuating said rock shafts.

4. In a tractor lawn mower, the combination with a tractor having a frame, of a cross-bar rigidly secured to said frame, a ground engaging mower unit, forwardly and downwardly inclined links pivotally connected to said mower unit and having portions thereof connected to said cross-bar at spaced points thereof, whereby relative lateral movement of said mower unit and said tractor is prevented.

5. In a tractor lawn mower, the combination with a tractor having a frame, of a cross-bar rigidly secured to said frame, a mower unit, and downwardly and forwardly inclined links pivotally connected to said mower unit and to said cross-bar, the pivotal connection between said cross-bar and said links permitting said mower unit to run freely upon the ground and to rotate about an axis transverse of the direction of travel.

6. In a tractor lawn mower, the combination with a tractor, of a ground engaging mower unit, downwardly and forwardly inclined links pivotally connected to said mower unit and to the frame of said tractor, a rock shaft journalled upon the frame of said tractor, rock arms upon said shaft, and flexible connections between said rock arms and mower unit whereby rotation of said rock shaft will raise and lower said unit, and means for automatically taking up slack in the flexible connections.

7. In a tractor lawn mower, the combination with a tractor and a ground engaging mower unit, of links pivotally connected to said mower unit and to the frame of said tractor, inclined downwardly from the frame to said unit, means for raising and lowering said unit including flexible connections, and means for automatically taking up slack in said connections.

In testimony whereof I affix my signature.

FAYETTE M. SEELEY.